(12) United States Patent
Dick

(10) Patent No.: US 6,840,002 B1
(45) Date of Patent: Jan. 11, 2005

(54) DEHOOKING DEVICE WITH SLIDABLE BITE SLEEVE

(75) Inventor: Lyndon Shawn Dick, Ormond Beach, FL (US)

(73) Assignee: Aquatic Release Conservation, Inc., Ormond Beach, FL (US)

( * ) Notice: Subject to any disclaimer, the term of this patent is extended or adjusted under 35 U.S.C. 154(b) by 0 days.

(21) Appl. No.: 10/712,731

(22) Filed: Nov. 12, 2003

(51) Int. Cl.$^7$ .......................................... A01K 97/18
(52) U.S. Cl. ............................................. 43/53.5
(58) Field of Search ........................................ 43/53.5

(56) References Cited

U.S. PATENT DOCUMENTS

| | | | | |
|---|---|---|---|---|
| 2,441,458 A | * | 5/1948 | Underwood | 43/53.5 |
| 2,578,289 A | * | 12/1951 | Danielson | 43/53.5 |
| 2,749,653 A | * | 6/1956 | Patrowsky et al. | 43/53.5 |
| 2,781,599 A | * | 2/1957 | Steiner | 43/53.5 |
| 2,892,284 A | * | 6/1959 | Shawhan | 43/53.5 |
| 2,947,106 A | | 8/1960 | Lewan | |
| 3,011,286 A | * | 12/1961 | Wallace | 43/53.5 |
| 3,419,924 A | | 1/1969 | Archibald | |
| 3,451,157 A | * | 6/1969 | Jones | 43/53.5 |
| 3,713,243 A | | 1/1973 | Tetzner | |
| 3,721,034 A | * | 3/1973 | Collins | 43/53.5 |
| D227,759 S | * | 7/1973 | Enagureto | 43/53.5 |
| 4,028,825 A | * | 6/1977 | Tetzner | 43/53.5 |
| 4,342,171 A | * | 8/1982 | Cripps et al. | 43/53.5 |
| 4,590,702 A | * | 5/1986 | Chestnutt | 43/53.5 |
| 4,833,817 A | * | 5/1989 | Silverthorn | 43/53.5 |
| 4,914,853 A | * | 4/1990 | Swindle | 43/53.5 |
| 5,307,586 A | * | 5/1994 | Palmer | 43/53.5 |
| D382,628 S | | 8/1997 | Swindle | |
| 5,983,555 A | * | 11/1999 | Biel | 43/53.5 |
| 6,205,699 B1 | * | 3/2001 | Bogni | 43/53.5 |
| 6,397,512 B1 | * | 6/2002 | Chang | 43/53.5 |
| 6,397,513 B1 | | 6/2002 | Reed | |
| 6,571,505 B1 | * | 6/2003 | Poiencot, Jr. | 43/5 |
| 2003/0029075 A1 | * | 2/2003 | Hebard | 43/53.5 |

FOREIGN PATENT DOCUMENTS

| | | | | |
|---|---|---|---|---|
| DE | 3204976 A1 | * | 8/1983 | |
| DE | 3204976 A1 | | 8/1983 | |
| DE | 10103628 C1 | * | 8/2002 | |
| FR | 2811201 A1 | * | 1/2002 | |
| GB | 1483589 A1 | * | 8/1977 | 43/53.5 |
| GB | 2028072 A1 | * | 3/1980 | 43/53.5 |
| GB | 2294190 A1 | * | 4/1996 | |
| GB | 2300554 A1 | * | 11/1996 | |
| GB | 2342553 A1 | * | 4/2000 | |
| JP | 11-225641 A1 | * | 8/1999 | |

* cited by examiner

Primary Examiner—Darren W. Ark
(74) Attorney, Agent, or Firm—Edward M. Livingston; Angela M. Miller; The Livingston Firm

(57) ABSTRACT

A dehooking device with a slidable bite sleeve having a rod (1) with a spiral looped hook removal end (2), handle (3), and a slidable bite sleeve (4). The rod (1) is preferably made of steel while the bite sleeve (4) is preferably made of plastic. The method of use of the present invention will permit the removal of a hook from a fish (9), turtle, or other sea creature's mouth while being able to maintain the mouth in a somewhat open position. Furthermore, the use of this invention protects the mouth of the fish, turtle, or other sea creature by shielding the hook during the removal process.

9 Claims, 2 Drawing Sheets

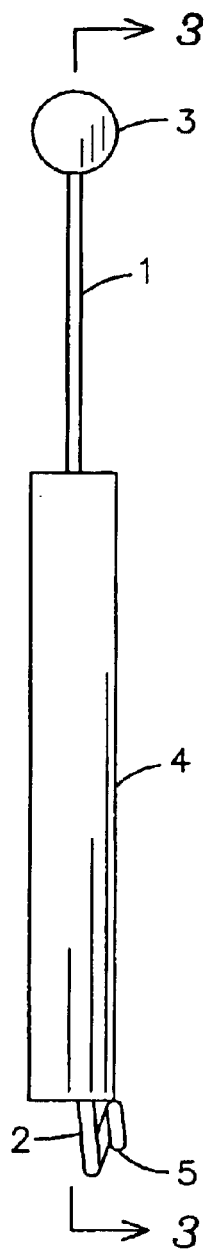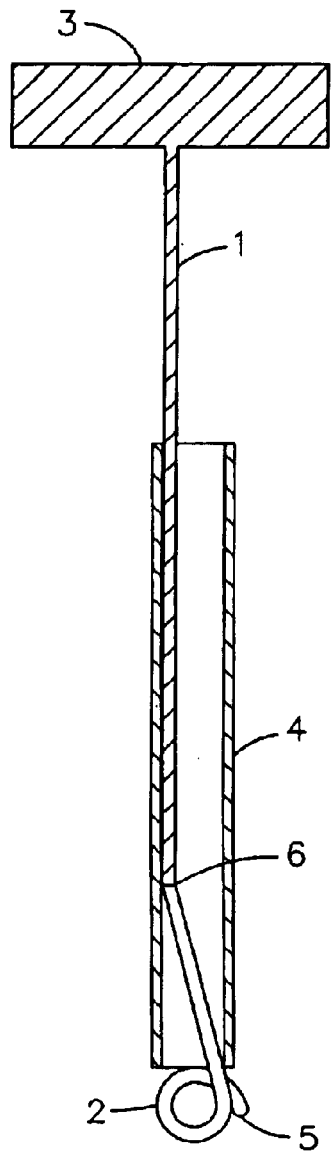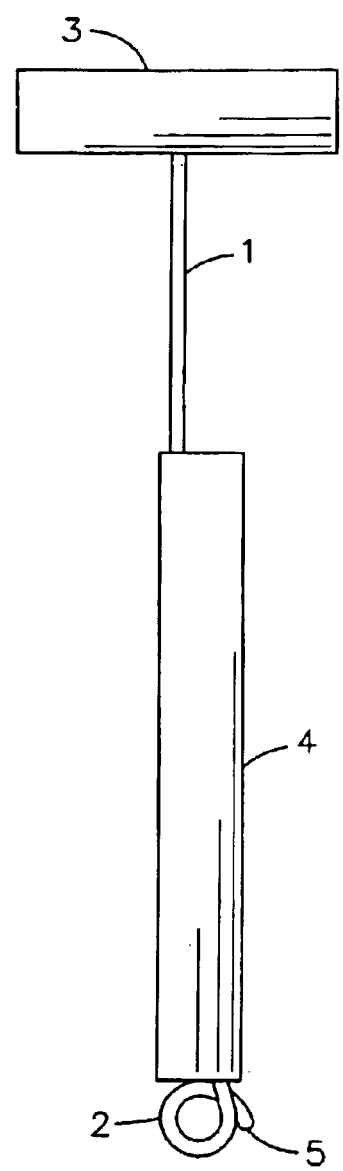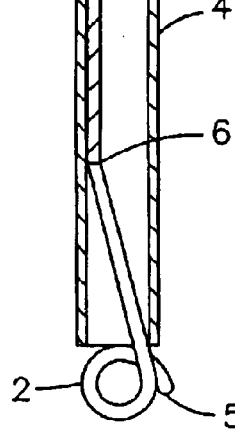
FIG. 1
FIG. 2
FIG. 3

DEHOOKING DEVICE WITH SLIDABLE BITE SLEEVE

BACKGROUND OF THE INVENTION

This invention relates to dehooking devices, specifically a dehooking device with a slidable mouth bite sleeve for safely removing a hook from a fish or turtle's mouth while being able to maintain the mouth in a somewhat open position.

When a person catches a fish or some other sea creature and reels it in, the fish or creature instinctively closes its mouth around the hook and line. In addition, when it is being handled by a person, the fish or creature resists opening its mouth as a defense mechanism. Thus, a person must proceed with caution so as not to injure himself or herself when removing a fish hook from a fish or other sea creature. For instance, the person could puncture his or her finger on the hook itself, get a cut from the projections on the creature or be bitten by the creature, all from trying to remove a hook and line from the creature's mouth.

Additionally, if the hook is not removed from the creature in a certain manner, the fisherperson could actually puncture the craeature's inside intestinal or airbag walls with the hook, thus degrading the quality of meat. Even if the fisherperson decided not to keep his or her catch, the fish's scales and/or fins may be damaged by handling the fish with his or her hands to such an extent that the fish or creature will not survive once returned to the water.

Thus, the need exists for a fish dehooking device so that a person can safely remove a hook without fear of injuring himself or the sea creature caught.

Listed below for consideration is known related prior art:

| Pat. No. (U.S. unless otherwise specified) | Inventor | Issue Date |
| --- | --- | --- |
| 4,914,853 | Swindle | Apr. 10, 1990 |
| Des. 382,628 | Swindle | Aug. 19, 1997 |
| 6,397,513 B1 | Reed | June 4, 2002 |
| 5,307,586 | Palmer | May 3, 1994 |
| 2,947,106 | Lewan | Aug. 2, 1960 |
| 4,590,702 | Chestnutt | May 27, 1986 |
| DE3204976A1 | Scholtz et al. | Dec. 2, 1982 |
| 2,749,653 | Patrowsky et al. | June 12, 1956 |
| 2,781,599 | Steiner | Feb. 19, 1957 |
| 3,419,924 | Archibald | Jan. 7, 1969 |
| Des. 227,759 | Enagureto | July 17, 1973 |
| 3,713,243 | Tetzner | Jan. 30, 1973 |

Although the above patents disclose various fish hook removal devices, none disclose a slidable bite sleeve as is disclosed in the present invention.

SUMMARY OF THE INVENTION

The primary object of the present invention is to provide a dehooking device with slidable bite sleeve that permits a person to remove a hook from the caught creature's mouth while being able to maintain the mouth in a somewhat open position without touching the hook or creature.

A further object of the present invention is to provide a dehooking device with slidable bite sleeve that shields the hook while the hook is being removed so it does not damage or cut the creature's mouth.

An even further object of the present invention is to provide a dehooking device with slidable bite sleeve that is durable.

This invention fulfills these and other objects by providing a dehooking device with slidable bite sleeve having a rod held by a T-shaped handle. The rod is bent slightly at the outer end and has a curve for detaching hooks from the mouth of a sea creature, particularly a fish or turtle. The bite sleeve is a cylindrical pipe that moves along the rod from the handle to the hook removal end.

To use the device, the user must keep the bite sleeve pulled up along the rod when engaging the leader of the fishing line to allow for proper leader and hook engagement. While maintaining the leader tension, the user places the looped hook removal end on the leader at a 90 degree angle with the open end of the looped hook removal end facing upwards. The user then pulls the handle towards himself or herself using one hand while maintaining a grip on the bite sleeve with the other hand until the open end of the looped hook removal end engages the leader. The user then turns the handle ¼ turn clockwise so the leader is now in the center of the looped hook removal end. The user then releases the bite sleeve, allowing it to fall to the bottom of the device. Following the leader, the user inserts the looped hook removal end and bite sleeve into as far into the mouth of the animal as it will allow before biting down. Once the animal bites down, the rod still maintains a sliding distance of about six inches in or out of the animal. The user then continues to follow the leader down to the shank of the hook. After the looped hook removal end is seated on the shank of the ingested hook, the user gives a sharp jab downward on the handle. The hook is removed and the point of the hook will rotate and stop on the offset angle of the rod, protecting the point and preventing re-engagement of the hook on the animal. After the hook is finally dislodged, the user pulls the rod out of the animal until it is flush against the bite sleeve. The bite sleeve will cover the hook and further prevent re-engagement. The user simply waits for the animal, be it fish, turtle or some other aquatic creature, to open its mouth and remove the entire device and hook.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF DRAWINGS

This invention is described by appended claims in relation to description of a preferred embodiment with reference to the following drawings which are explained briefly as follows:

FIG. 1 is a side view of the present invention;

FIG. 2 is a front view of the embodiment of FIG. 1;

FIG. 3 is a downward cut away view along lines 3—3 of the embodiment of FIG. 2.

DESCRIPTION OF PREFERRED EMBODIMENT

Figure 4:
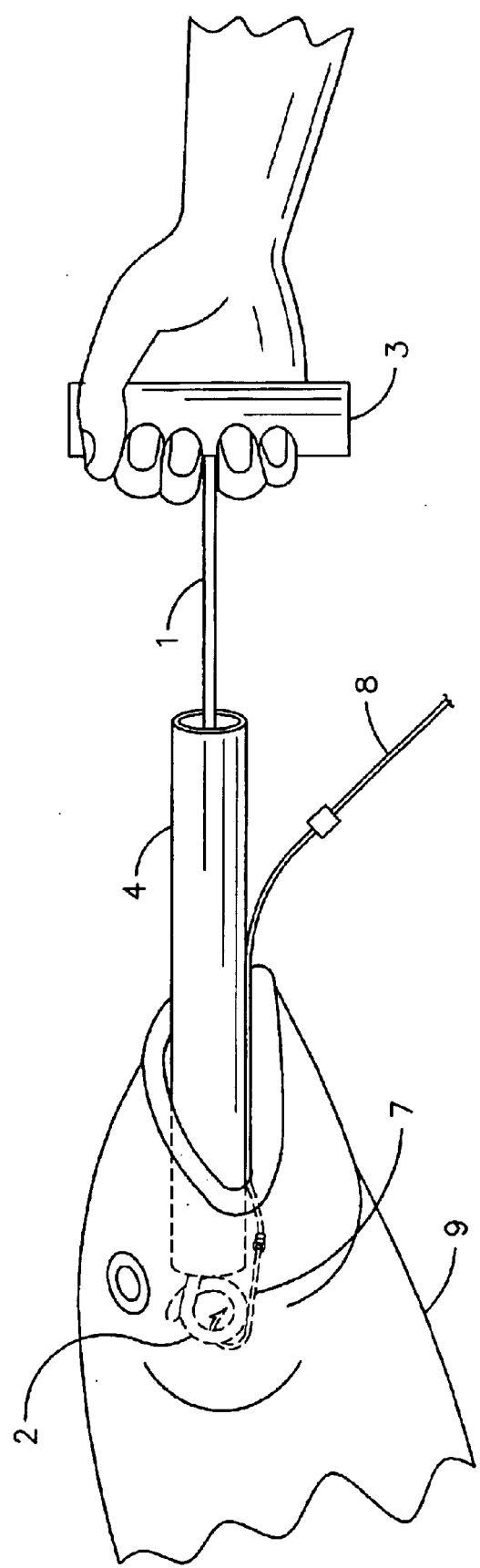
FIG. 4 is a perspective view of the embodiment of FIG. 1 in use.

Listed numerically below with reference to the drawings are terms used to describe features of this invention. These terms and numbers assigned to them designate the same features throughout this description.

1. rod
2. looped hook removal end
3. handle
4. bite sleeve 5. rounded end
6. angled portion
7. hook
8. fishing line
9. fish Referring to FIG. 1, the dehooking device with slidable bite sleeve has a rod 1 of a predetermined length, preferably made of steel, that is attached to a handle 3 at a first end such that an axis of the handle is perpendicular to a longitudinal axis of the rod and has a spiral looped hook removal end 2 at a second end. The rod 1 is surrounded by a movable cylindrical bite sleeve 4, preferably made of plastic, that is freely slidable alone the length of the rod 1 such that the sleeve is capable of both abutting a surface of the handle 3 when the sleeve is positioned at the first end of the rod and abutting the spiral looped hook removal end 2 when the sleeve is positioned at the second end of the rod. The spiral looped hook removal end 2 of the rod 1 has a rounded end 5 so as not to injure the insides of the fish or sea creature.

With reference to FIG. 2, a front view of the embodiment of FIG. 1 is shown. The bite sleeve 4 is designed so as to rest on the looped portion 2 of the rod 1 when not in use.

In FIG. 3, a downward cut away view along the lines 3—3 of the embodiment of FIG. 1 is shown. The rod 1 has an angled portion 6 so as to allow a better hook-grasping position.

Finally, in FIG. 4, a perspective view of the embodiment of FIG. 1 in use is shown. To remove a hook 7 from the mouth of a fish 9, the user keeps the bite sleeve 4 pulled up along the rod 1 when engaging the leader of the fishing line 8 to allow for proper leader and hook engagement. While maintaining the leader tension, the user places the looped hook removal end 2 on the leader at a 90 degree angle with the open end of the looped hook removal end 2 facing upwards. The user then pulls the handle 3 towards himself or herself using one hand while maintaining a grip on the bite sleeve 4 with the other hand until the open end of the looped hook removal end 2 engages the leader. The user then turns the handle 3 ¼ turn clockwise so the leader is now in the center of the looped hook removal end 2. The user then releases the bite sleeve 4, allowing it to fall to the bottom of the device. Following the leader, the user inserts the looped hook removal end 2 and bite sleeve 4 into as far into the mouth of the animal as it will allow before biting down. Once the animal bites down, the rod 1 still maintains a sliding distance of about six inches in or out of the animal. The user then continues to follow the leader down to the shank of the hook 7. After the looped hook removal end 2 is seated on the shank of the ingested hook 7, the user gives a sharp jab downward on the handle 3. The hook 7 is removed and the point of the hook 7 will rotate and stop on the offset angled portion 6 of the rod 1, protecting the point and preventing re-engagement of the hook 7. After the hook 7 is finally dislodged, the user pulls the handle 3 so the rod 1 is out of the animal until it is flush against the bite sleeve 4. The bite sleeve 4 will cover the hook 7 and further prevent re-engagement on the animal. The user simply waits for the fish 7 to open its mouth and remove the entire device and hook 7.

The advantage of using a sprial looped hook removal end 2 is that it allows for greater security of a fishing line 8 over traditional hooks having a C-shape, U-shape or other rounded shapes wherein a portion of the hook is open.

Having thus described my invention, I claim:

1. A dehooking device with slidable bite sleeve comprising:

a rod having a predetermined length;

a handle having an axis that is perpendicular to a longitudinal axis of said rod and which is attached to one end of said rod;

a spiral looped hook removal end at the opposite end of the rod from the handle; and a slidable bite sleeve surrounding the rod and being freely slidable along the length of the rod such that said sleeve is capable of both abutting a surface of said handle when said sleeve is positioned at the one end of said rod and abutting said spiral looped hook removal end when said sleeve is positioned at the opposite end of the rod.

2. The dehooking device with slidable bite sleeve of claim 1 wherein:

said rod is steel;

said spiral looped hook removal end is blunt; and said rod has an angled portion above said spiral looped hook removal end.

3. The dehooking device with slidable bite sleeve of claim 1 wherein:

said slidable bite sleeve surrounding said rod is plastic;

said slidable bite sleeve is sized at least half said length of said rod;

said slidable bite sleeve is cylindrical; and said slidable bite sleeve is movable on the rod.

4. The dehooking device with slidable bite sleeve of claim 1 wherein:

said handle is welded to said rod.

5. The dehooking device with slidable bite sleeve of claim 1 wherein:

said handle is cylindrical.

6. A method for using a dehooking device with slidable bite sleeve consisting of a rod having a predetermined length; a handle having an axis that is perpendicular to a longitudinal axis of said rod and being attached to one end of said rod; a spiral looped hook removal end at a second end of the rod opposite the handle; and a slidable bite sleeve surrounding the rod and being freely slidable along the length of the rod such that said sleeve is capable of abutting either a surface of said handle or said spiral looped hook removal end, comprising the steps of:

a. holding the slidable bite sleeve close to the handle;

b. placing the device on a fishing line leader at a 90 degree angle with the spiral looped hook removal end facing upwards;

c. pulling the handle towards a user while maintaining leader tension until the spiral looped hook removal end engages the fishing line leader;

d. turning the handle ¼ turn clockwise so the leader is in a center of the spiral looped hook removal end;

e. releasing the slidable bite sleeve so it falls to the bottom the second end of the rod;

f. inserting the spiral looped hook removal end into a mouth of an animal;

g. inserting the slidable bite sleeve into the mouth of an animal;

h. sliding the rod further into the animal, following the leader;

i. giving a sharp jab downward on the handle when the spiral looped hook removal end is resting on an ingested hook;

j. pulling the rod out of the animal until it stops at the slidable bite sleeve; and k. removing the entire device from the animal when the animal opens its mouth.

7. The method claim of claim 6 wherein:
said animal is a fish.

8. The method claim of claim 6 wherein:
said animal is a turtle.

9. The method claim of claim 6 wherein:
said animal is a shark.

* * * * *